(12) United States Patent
Binder et al.

(10) Patent No.: US 10,706,608 B2
(45) Date of Patent: Jul. 7, 2020

(54) TREE TRAVERSAL WITH BACKTRACKING IN CONSTANT TIME

(71) Applicant: NVIDIA Corporation, Santa Clara, CA (US)

(72) Inventors: Nikolaus Binder, Berlin (DE); Alexander Keller, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 613 days.

(21) Appl. No.: 15/409,429

(22) Filed: Jan. 18, 2017

(65) Prior Publication Data
US 2017/0206231 A1   Jul. 20, 2017

Related U.S. Application Data

(60) Provisional application No. 62/280,641, filed on Jan. 19, 2016.

(51) Int. Cl.
*G06F 17/00* (2019.01)
*G06T 15/06* (2011.01)
*G06T 15/00* (2011.01)

(52) U.S. Cl.
CPC ............ *G06T 15/06* (2013.01); *G06T 15/005* (2013.01)

(58) Field of Classification Search
CPC .............................. G06T 15/06; G06T 15/005
See application file for complete search history.

(56) References Cited

U.S. PATENT DOCUMENTS

| | | |
|---|---|---|
| 6,047,283 A | 4/2000 | Braun |
| 8,289,324 B1 | 10/2012 | Laine et al. |
| 8,411,088 B2 | 4/2013 | Sevastianov et al. |
| 8,922,556 B2 | 12/2014 | Xin et al. |
| 8,963,918 B2 | 2/2015 | Zhou et al. |
| 9,275,494 B2 | 3/2016 | Lee et al. |
| 9,390,545 B2 | 7/2016 | Lee et al. |
| 9,495,792 B2 | 11/2016 | Lee et al. |

OTHER PUBLICATIONS

Barringer et al., Dynamic Stackless Binary Tree Traversal,Journal of Computer Graphics Techniques, vol. 2, No. 1, 2013, retrieved on Jun. 20, 2019, retrieved from: <URL: http://citeseerx.ist.psu.edu/viewdoc/download?doi=10.1.1.1016.7569&rep=rep1&type=pdf>.*

(Continued)

*Primary Examiner* — Tyler J Torgrimson
(74) *Attorney, Agent, or Firm* — Leydig, Voit & Mayer, Ltd.

(57) ABSTRACT

A method, computer readable medium, and system are disclosed for performing tree traversal with backtracking in constant time. The method includes the steps of traversing a tree, maintaining a bit trail variable and a current key variable during the traversing, where the bit trail variable includes a first plurality of bits indicating tree levels on which a node has been postponed along a path from the root of the tree during the traversing, and the current key variable includes a second plurality of bits indicating a number of a current node within the tree, and performing backtracking within the tree during the traversing, utilizing the bit trail variable and the current key variable.

20 Claims, 14 Drawing Sheets

(56) References Cited

OTHER PUBLICATIONS

Afra et al., "Stackless Multi-BVH traversal for CPU, MIC and GPU ray tracing," Computer Graphics Forum, vol. 33, No. 1, 2014, pp. 129-140.
Aila et al., "Understanding the efficiency of ray traversal on GPUs," Proc. High-Performance Graphics, Eurographics and ACM, 2009, pp. 145-149.
Bikker, J., "Ray Tracing in Real-Time Games," PhD thesis, Delft University of Technology, the Netherlands, 2012, pp. 1-215.
Boulos et al., "Ray-box sorting," Ray Tracing News, vol. 19, No. 1, 2006, pp. 7-8, retreived from http://www.realtimerendering.com/resources/RTNews/html/rtnv19n1.html#art4.
Dammertz et al., "Shallow bounding volume hierarchies for fast SIMD ray tracing of incoherent rays," Computer Graphics Forum (Proceedings of Eurographics Symposium on Rendering), vol. 27, No. 4, 2008, pp. 1225-1234.
Eisenacher et al., "Sorted Deferred Shading for Production Path Tracing," Eurographics Symposium on Rendering, Eurographics Association, vol. 32, No. 4, 2013, pp. 125-132.
Fox et al., "Practical minimal perfect hash functions for large databases," Commun. of the ACM, vol. 35, No. 1, 1992, pp. 105-121.
Glassner, A., "Space subdivision for fast ray tracing," IEEE Computer Graphics & Applications, vol. 4, No. 10, 1984, pp. 15-22.
Hall, D., "The AR250—A new architecture for ray traced rendering," Advance Rendering Technology, 1999, pp. 1-11.
Hanika et al., "Two-level ray tracing with reordering for highly complex scenes," In Proceedings of Graphics Interface 2010, 2010, pp. 145-152.
Hughes et al., "Kd-jump: A path-preserving stackless traversal for faster isosurface raytracing on GPUs," IEEE Transactions on Visualization and Computer Graphics, vol. 15, No. 6, 2009, pp. 1555-1562.
Laine et al., "Megakernels considered harmful: Wavefront path tracing on GPUs," In Proceedings of High-Performance Graphics 2013, 2013, pp. 1-7.
Laine, S., "Restart trail for stackless BVH traversal," In Proceedings of High Performance Graphics 2010, Eurographics and ACM, 2010, pp. 107-111.
McCombe, J., "Introduction to PowerVR ray tracing," GDC Vault Presentation Recording, 2014, pp. 15-24.
Nah et al., "Ray-Core: A ray-tracing hardware architecture for mobile devices," ACM Trans. Graph. 2014, vol. 33, No. 6, 2014, pp. 162:1-162:15.
Pharr et al., "Physically Based Rendering," Morgan Kaufmann, 2nd Ed., 2010, pp. 1-1172.

Smits, B., "Efficiency issues for ray tracing," Journal of Graphics Tools, vol. 3, No. 2, 1998, pp. 1-12.
Woop et al., "RPU: A programmable ray processing unit for realtime ray tracing," ACM Transactions on Graphics (Proc. SIGGRAPH 2005), vol. 24, No. 3, 2005, pp. 434-444.
Carr et al., "Fast GPU Ray Tracing of Dynamic Meshes using Geometry Images," Proc. Graphics Interface, May 2006, pp. 203-209.
Hapala et al., "Efficient Stack-less BVH Traversal for Ray Tracing," SCCG 2011 Proceedings of the 27th Spring Conference on Computer Graphics, pp. 7-12.
Popov et al., "Stackless KD-Tree Traversal for High Performance GPU Ray Tracing," Eurographics 2007, vol. 26, No. 3, 2007, pp. 1-10.
Lagae et al., "Compact, Fast and Robust Grids for Ray Tracing," Eurographics Symposium on Rendering 2008, vol. 27, No. 4, 2008, pp. 1-10.
Binder et al., "Efficient Stackless Hierarchy Traversal on GPUs with Backtracking in Constant Time," High Performance Graphics, 2016, pp. 1-10.
Horn et al., "Interactive k-D Tree GPU Raytracing," I3D '07 Proceedings of the 2007 symposium on Interactive 3D graphics and games, 2007, pp. 167-174.
Tarjan et al., "Storing a sparse table," Communications of the ACM, vol. 22, No. 11, Nov. 1979, pp. 606-611.
Lefebrve et al., "Perfect spatial hashing," Proceedings of ACM SIGGRAPH 2006, vol. 25, No. 3, Jul. 2006, pp. 579-588.
Dammertz, H., Acceleration Methods for Ray Tracing based Global Illumination, Open Access Repositorium der Universität Ulm, 2011, pp. 1-214.
Murguia et al., "Bit-trail traversal for stackless LBVH on DirectCompute," GPU Pro 4, 2013, pp. 319-335.
Garcia et al., "Fast parallel construction of stack-less complete LBVH trees with efficient bit-trail traversal for ray tracing," Proceeding VRCAI '14 Proceedings of the 13th ACM SIGGRAPH International Conference on Virtual-Reality Continuum and its Applications in Industry, 2014, pp. 151-158.
Barringer et al., "Dynamic Ray Stream Traversal," ACM Trans. Graph. vol. 33, No. 4, Jul. 2014, pp. 1-9.
Binder et al., "Stackless ray tracing of patches from feature-adaptive subdivision on GPUs," ACM SIGGRAPH 2015 Talks Proceedings, 2015, pp. 1.
Foley et al., "Kd-Tree Acceleration Structures for a GPU Raytracer," Graphics Hardware, 2005, pp. 15-22.
Gunther et al., "Realtime Ray Tracing on GPU with BVH-based Packet Traversal," IEEE Symposium on Interactive Ray Tracing, 2007, pp. 1-6.
Thrane et al., "A Comparison of Acceleration Structures for GPU Assisted Ray Tracing," Master's thesis, Aarhus Universitet, Denmark, Aug. 2005, pp. 1-109.

* cited by examiner

```
nodeAddr ← rootNode,
nodeKey ← 1,
bitTrail ← 0,
mrpnAddr ← unknown, // address of most recently postponed node
while nodeAddr ≠ done do
    while nodeAddr is an internal node do
        (boxes, L, R, uncle, grandUncle) ← nodeData[nodeAddr],
        if mrpnAddr = unknown then
            if bitTrail & 0x6 then
                if bitTrail & 0x2 then mrpnAddr ← uncle,
                else mrpnAddr ← grandUncle, (hit_L, hit_R, closest) ← intersectBoxes(ray, boxes),
        if hit_L or hit_R then
            if ¬ hit_L or closest = R then nodeAddr ← R,
            else nodeAddr ← L,
            nodeKey ← nodeKey ≪ 1,
            bitTrail ← bitTrail ≪ 1,
            if hit_L and hit_R then
                bitTrail ← bitTrail ⊕ 1, // xor
                if closest = L then
                    mrpnAddr ← R
                else
                    mrpnAddr ← L
            if nodeAddr = R then
                nodeKey ← nodeKey ⊕ 1, // xor
        else
            break, if nodeAddr is a leaf then
        (primData, uncle, grandUncle) ← leafData[nodeAddr],
        intersect(ray, primData),
        if mrpnAddr = unknown then
            if bitTrail & 0x6 then
                if bitTrail & 0x2 then mrpnAddr ← uncle,
                else mrpnAddr ← grandUncle, if bitTrail = 0 then
        nodeAddr ← done,
    else
        // Backtracking
        numLevels ← ctz(bitTrail), // count trailing zeroes
        bitTrail ← (bitTrail ≫ numLevels) ⊕ 1, // xor
        nodeKey ← (nodeKey ≫ numLevels) ⊕ 1, // xor
        if mrpnAddr ≠ unknown then
            nodeAddr ← mrpnAddr,
            mrpnAddr ← unknown,
        else
            d ← displacement[nodeKey & (D - 1)],
            if d < 0 then
                nodeAddr ← d,
                if (unsigned int) nodeAddr < 0xc0000000u then
                    nodeAddr ← nodeAddr - 0x80000000u,
            else
                nodeAddr ← hashMap[(nodeKey + d) mod H],
```

*Fig. 13*

TREE TRAVERSAL WITH BACKTRACKING IN CONSTANT TIME

CLAIM OF PRIORITY

This application claims the benefit of U.S. Provisional Application No. 62/280,641 titled "EFFICIENT STATUS HIERARCHY TRAVERSAL WITH BACKTRACKING IN CONSTANT TIME," filed Jan. 19, 2016, the entire contents of which is incorporated herein by reference.

FIELD OF THE INVENTION

The present invention relates to tree data structure traversal, and more particularly to performing backtracking during a tree data structure traversal.

BACKGROUND

Hierarchy traversal (e.g., tree data structure traversal) is an important building block for applications working on large data sets. As an example, accelerated ray tracing relies on traversing tree data structures in an order given by heuristics in order to efficiently find intersections of rays and scene geometry. One important component of hierarchy traversal is the ability to backtrack within a tree data structure. However, current methods for performing backtracking within a tree data structure have one or more of performance issues and storage size issues.

Thus, there is a need for addressing these issues and/or other issues associated with the prior art.

SUMMARY

A method, computer readable medium, and system are disclosed for performing tree traversal with backtracking in constant time. The method includes the steps of traversing a tree, maintaining a bit trail variable and a current key variable during the traversing, where the bit trail variable includes a first plurality of bits indicating tree levels on which a node has been postponed along a path from a root of the tree during the traversing, and the current key variable includes a second plurality of bits indicating a number of a current node within the tree, and performing backtracking within the tree during the traversing, utilizing the bit trail variable and the current key variable.

BRIEF DESCRIPTION OF THE DRAWINGS

FIG. 13 illustrates pseudocode of a traversal kernel that performs backtracking in constant time, in accordance with one embodiment.

DETAILED DESCRIPTION

Figure 1:
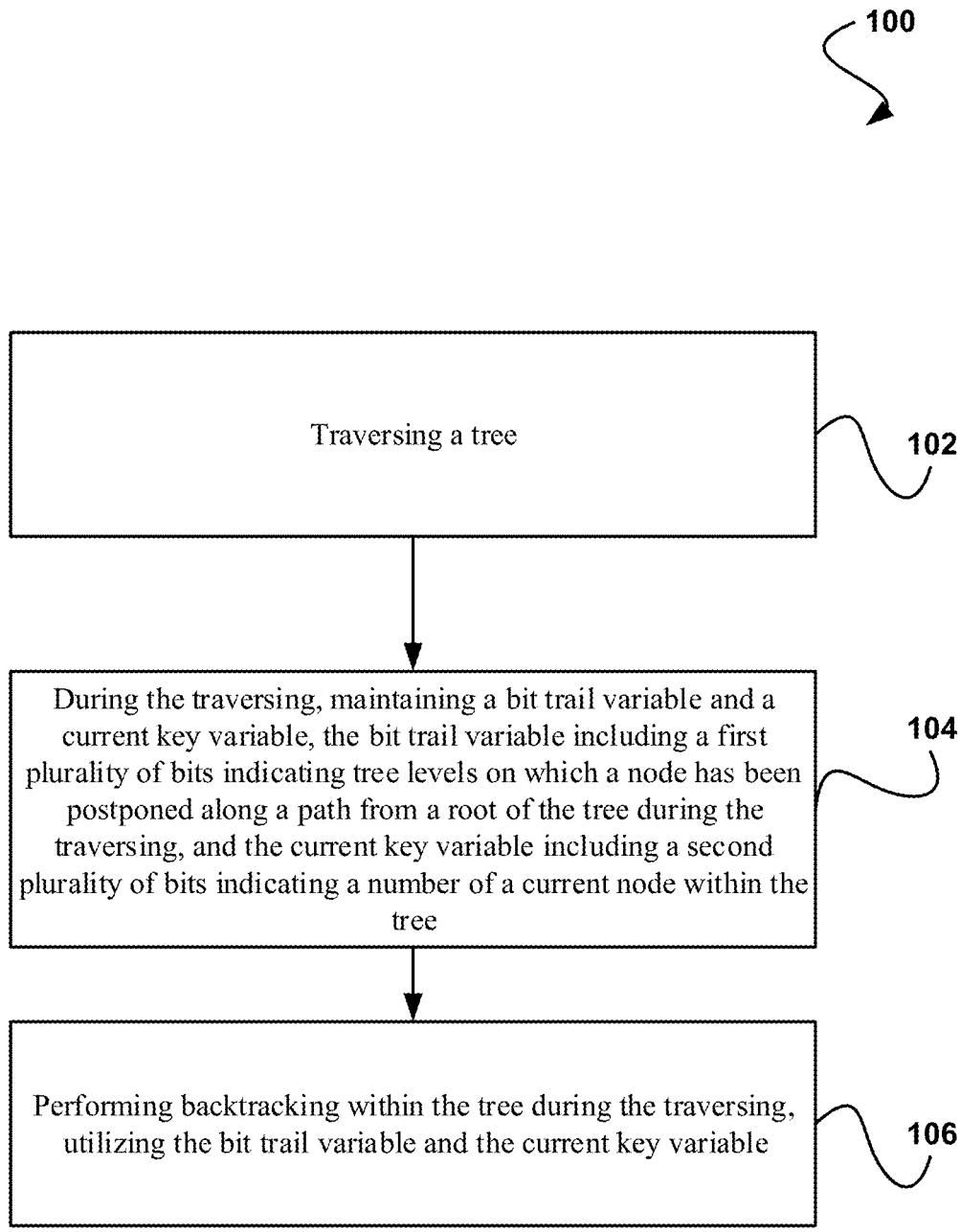
FIG. 1 illustrates a flowchart of a method for performing tree traversal with backtracking in constant time, in accordance with one embodiment.

FIG. 1 illustrates a flowchart of a method 100 for performing tree traversal with backtracking in constant time, in accordance with one embodiment. As shown in operation 102, a tree is traversed. In one embodiment, the tree may include a tree data structure. For example, the tree may include a binary tree or any other N-ary hierarchy. In another embodiment, the tree may include a plurality of nodes. For example, the tree may represent one or more bounding volume hierarchies (BVHs), where one or more geometric objects are wrapped in bounding volumes that form leaf nodes of the tree.

Additionally, in one embodiment, each node within the tree may be numbered according to one or more numbering conventions. For example, the node may have a number k. In addition, children of the current node may be numbered 2k and 2k+1. Furthermore, a parent of the current node may be numbered $\lfloor k/2 \rfloor$. Further still, a sibling of the current node may be numbered k⊕1, where ⊕ is the bit-wise XOR operation. In another embodiment, the root node may have the number k=1.

Further, in one embodiment, traversing the tree may include visiting (e.g., checking, updating, etc.) each node within the tree. In another embodiment, traversing the tree may be performed as part of a ray tracing operation (e.g., as part of image synthesis and/or light transport simulation), a collision detection operation, etc.

Further still, as shown in operation 104, during the traversing, a bit trail variable and a current key variable are maintained, where the bit trail variable includes a first plurality of bits indicating tree levels on which a node has been postponed along the path from a root of the tree during the traversing, and the current key variable includes a second plurality of bits indicating a number of a current node within the tree. In one embodiment, the second plurality of bits may represent a number of the current node in binary.

Also, in one embodiment, the current node may include a node that is currently being accessed within the tree during the traversing. In another embodiment, maintaining the bit trail variable and the current key variable may include storing the bit trail variable and the current key variable in a register.

In addition, as shown in operation 106, backtracking is performed within the tree during the traversing, utilizing the bit trail variable and the current key variable. In one embodiment, the traversing and backtracking may be performed using hardware (e.g., a hardware graphics processing unit (GPU), a hardware central processing unit (CPU), a reconfigurable logic field programmable gate array (FPGA), etc.) in constant time. In another embodiment, backtracking may be performed without maintaining a current key variable by iterating over uncles within the tree.

Furthermore, in one embodiment, the current key variable may be maintained by appending a 0 bit to the first plurality of bits when a left child of a node is selected when the traversing proceeds past the node, and appending a 1 bit to the first plurality of bits when a right child of the node is selected when the traversing proceeds past the node. In another embodiment, the bit trail variable may be maintained by appending a 0 bit to the second plurality of bits when no backtracking is required, and appending a 1 bit otherwise.

Further still, in one embodiment, performing the backtracking may include identifying a number of a postponed node. For example, a first number of bits may be determined, where the first number of bits includes a number of trailing 0 bits in the first plurality of bits, starting with a least significant bit of the first plurality of bits. Additionally, the first number of bits may be removed from the first plurality of bits of the bit trail variable to create a third plurality of bits, starting with the least significant bit of the first plurality of bits. Further, the first number of bits may be removed from the second plurality of bits of the current key variable to create a fourth plurality of bits, starting with the least significant bit of the second plurality of bits. Further still, the least significant bit of the fourth plurality of bits may be flipped to obtain the number of the postponed node in binary. Additionally, the last bit of the bit trail may be flipped. i.e. set to zero.

Also, in one embodiment, a node may include a finite number of references to uncle, grand uncle, grand grand uncle, etc, within the tree. In another embodiment, the number of the postponed node may be represented by p' and may be identified by calculating p':=(p SHR CTZ(t)) XOR 1, where t is the bit trail variable and p is the current key variable. In yet another embodiment, t may be updated to t SHR CTZ(t) XOR 1, where a SHR x denotes a bit shift operation of a x bits to the right, CTZ(t) counts a number of trailing zeroes of t, and XOR is a bit wise "exclusive or" operation.

Additionally, in one embodiment, an address of the postponed node may be obtained in constant time using a perfect hash map. For example, the perfect hash map may map the number of the postponed node to a memory address of the postponed node. In another example, the perfect hash map may map the number of the postponed node to an offset relative to a memory address, where the offset may require less bits than a complete memory address. In another example, the perfect hash map may represent the references to nodes in the tree as a collision free hash function. In yet another example, the perfect hash map may avoid a need for storing keys, and may allow for determining the memory address in constant time. In this way, backtracking may be performed in constant time, node access in memory may be performed in constant time, etc.

Further, in one embodiment, the perfect hash map may include a table h, having size H, that stores node addresses, as well as an additional displacement table d, having size D, where given a position p of a node, an index in the table h may be calculated as a(p):=(p+d[p mod D]) mod H. In another embodiment, a size of the additional displacement table d may be a power of two, where mod is the modular remainder operation.

Further still, in one embodiment, for each node of the tree, one or more of a reference to an uncle of the node and a reference to a grand uncle of the node may be stored in the node. In another embodiment, additional higher degree uncles may be stored within a node. For example, the references may be stored in padding space within the storage data for the node. In another embodiment, performing the backtracking may include accessing these references without using a perfect hash map.

Also, in one embodiment, during the traversing, a most recently postponed variable may be maintained that includes a third plurality of bits indicating a number of a most recently postponed node within the tree. For example, the most recently postponed node may include a sibling of the current node. In another example, the most recently postponed variable may be stored in a register.

In addition, in one embodiment, performing the backtracking may include accessing the most recently postponed node, using the most recently postponed variable, and updating the current key variable and bit trail variable.

In another embodiment, during backtracking, another variable m may be maintained that identifies levels on a path from a root of the tree to the current node within the tree on which either bounding boxes of two children do not overlap or a ray does not intersect an overlapping area.

Furthermore, in one embodiment, each bit of m may be assigned to one node on the path, where for a current depth d, the least significant bit corresponds to the current node, and the consecutive bits correspond to the previous levels, such that the d-th bit of m corresponds to the root node. In another embodiment, in response to identifying only a closest intersection, the traversing may omit levels for which the variable m indicates disjoint bounding boxes or for which the variable m indicates that the ray does not intersect the overlapping area.

Further still, in one embodiment, during the traversing, upon identifying an intersection, the bit trail variable t may be updated to t AND m, where AND denotes a bitwise "and" operation. Additionally, the current key variable and bit trail variable may be updated. Further, it may be determined if the most recently postponed node can be omitted by checking (t AND −t) AND m, where (t AND −t) preserves the least significant non-zero bit, while all other bits are set to zero. In another embodiment, the most recently postponed node may be accessed, using the most recently postponed variable.

Also, in one embodiment, during the traversing, an intersection may be identified at the current node within the tree. Additionally, the traversing may be restarted at the current node. In another embodiment, each bit of the first plurality of bits of the bit trail variable that refers to a node above the current node may be set to 1, and all other bits of the first plurality of bits may be set to 0. In yet another embodiment, the first plurality of bits of the bit trail variable may be reused upon determining that a current ray origin and direction match a previous ray origin and direction of a previous path segment. In still another embodiment, the reusing may be performed for one or more of transparency, translucency, and alpha cutouts.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

Parallel Processing Architecture

Figure 2:
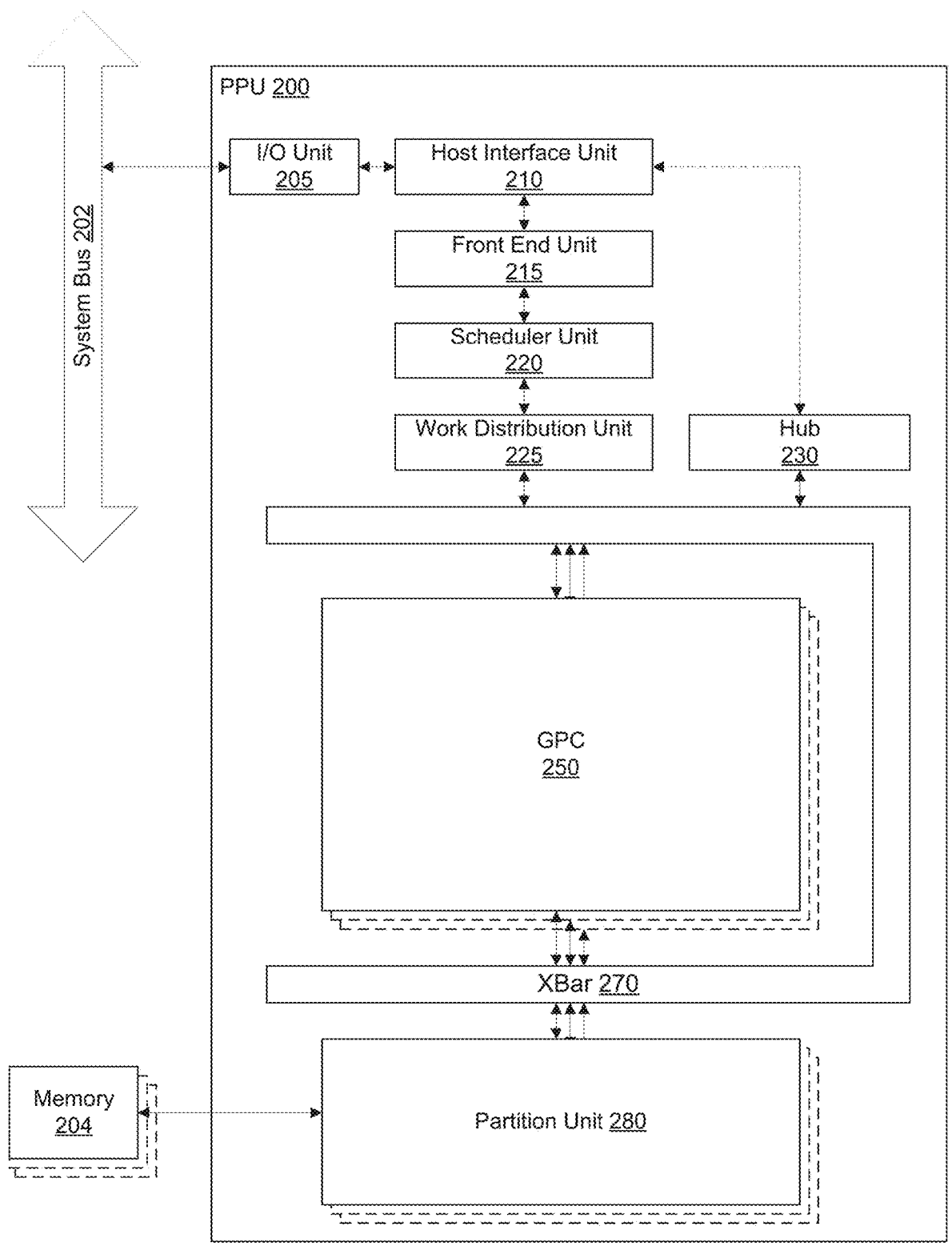
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, higher-dimensional image data may be generated for a light field display (4D) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
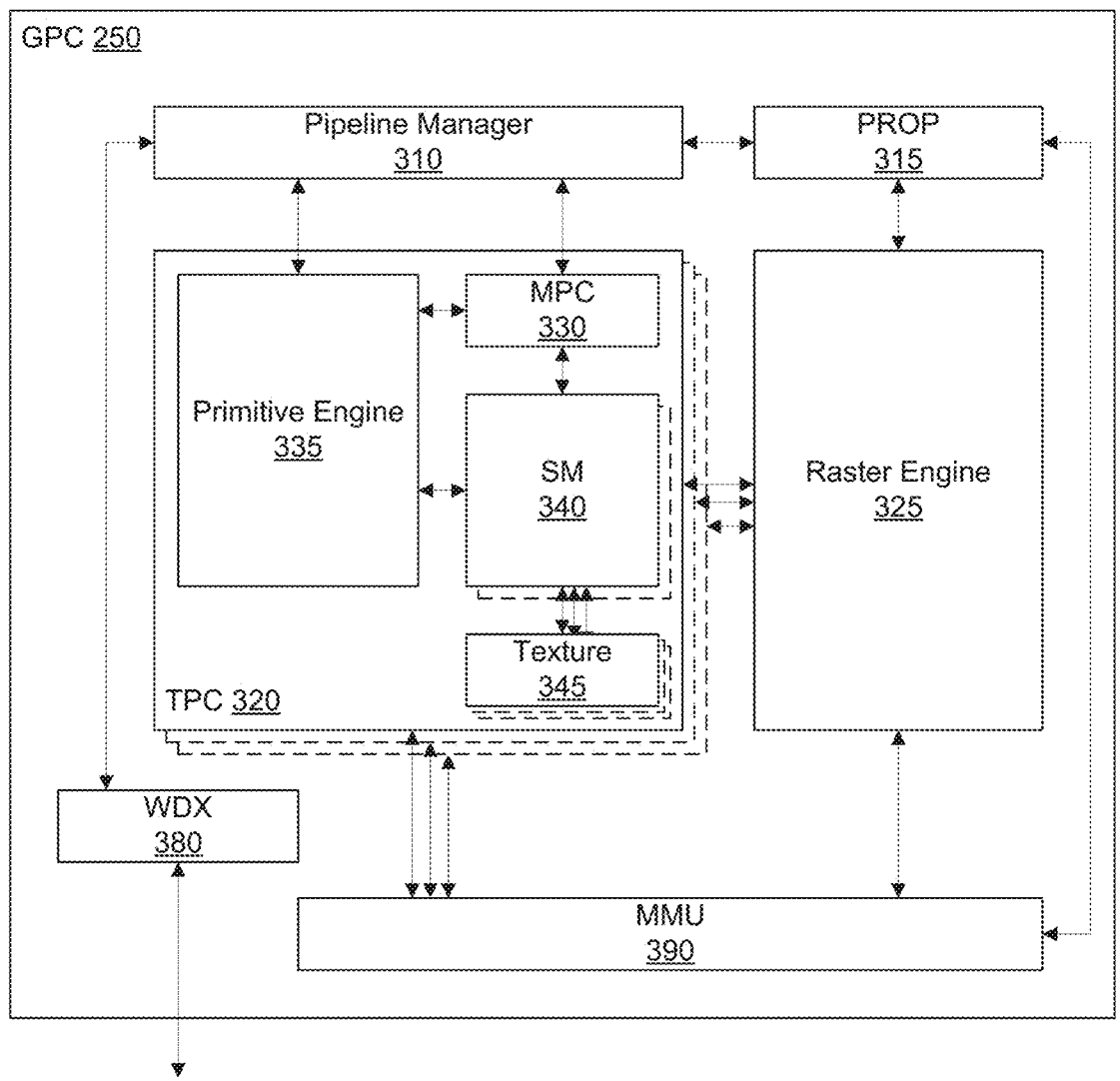
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction. Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
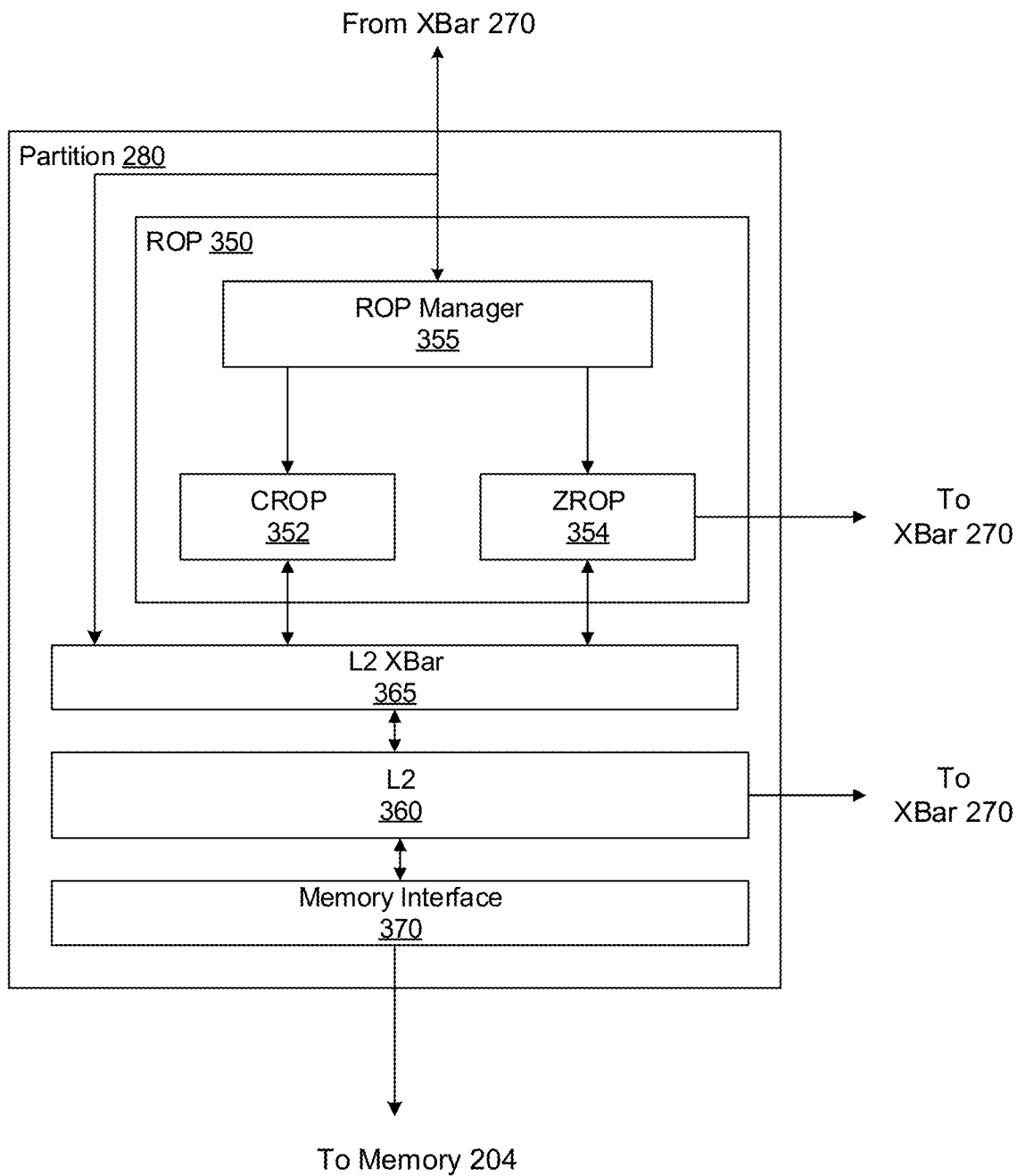
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (l2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
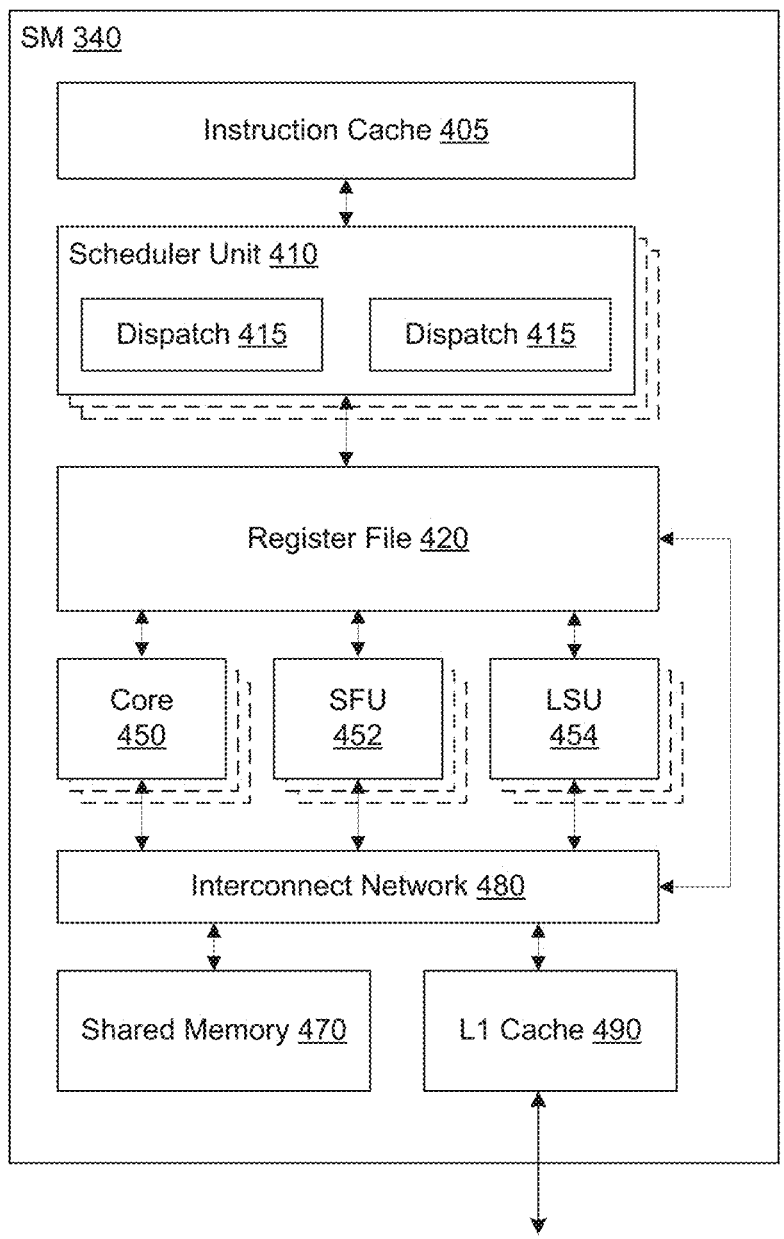
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350. SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes. e.g., a northbridge chipset and a southbridge chipset. In yet another embodiment, the PPU 200 may be an integrated graphics processing unit (iGPU) included in the chipset (i.e., Northbridge) of the motherboard.

Figure 5:
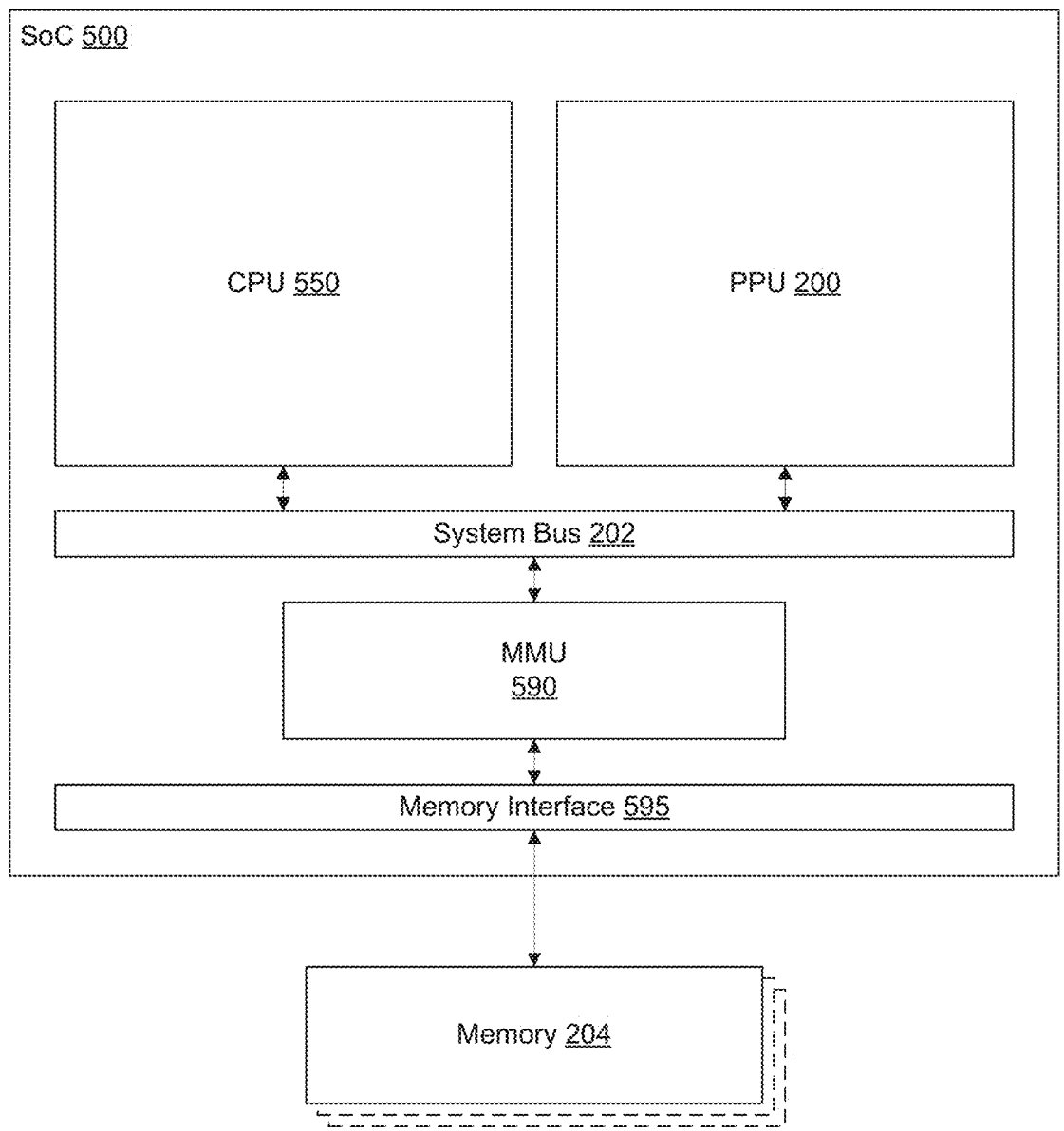
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
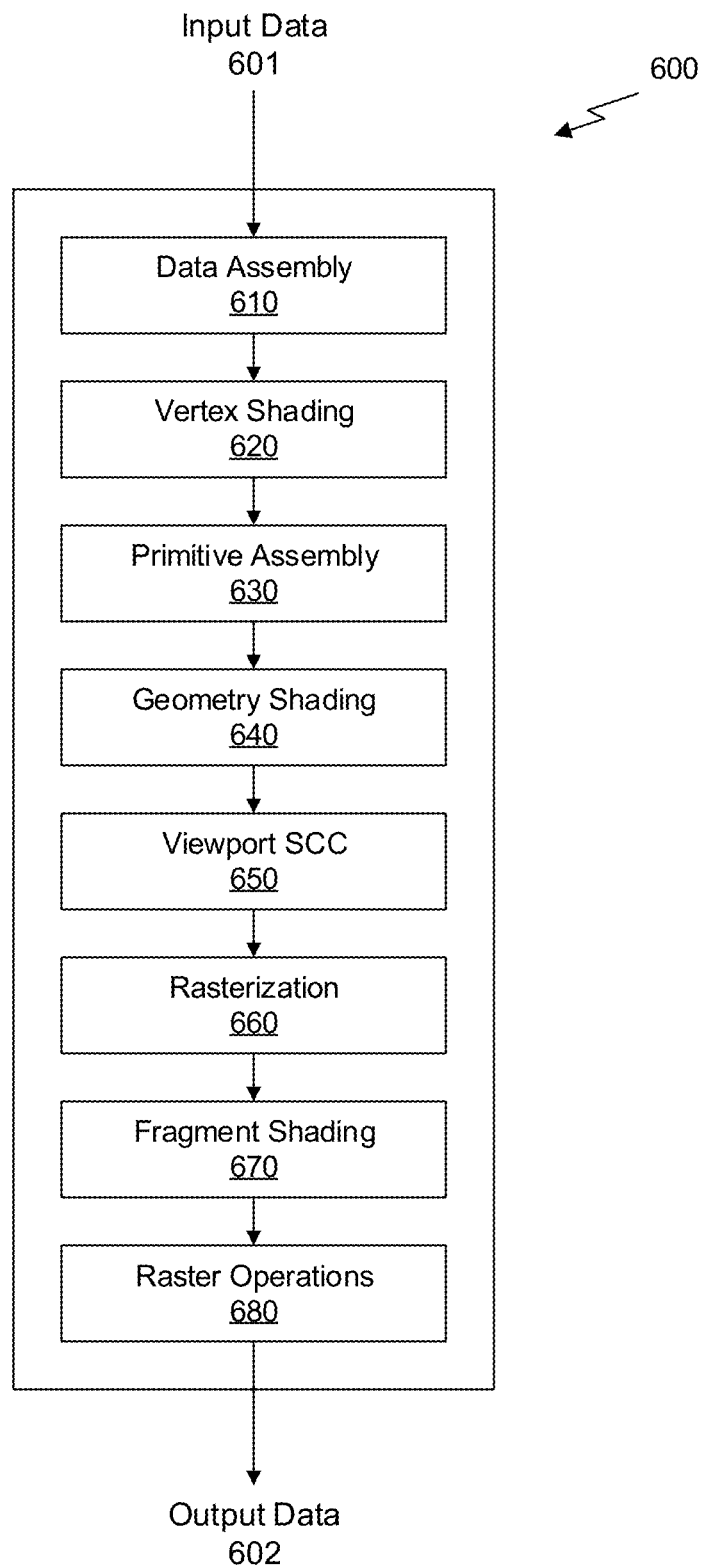
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs view port scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Efficient Stackless Hierarchy Traversal on GPUs with Backtracking in Constant Time Hierarchy traversal is a building block for applications working on large data sets. As an example, accelerated ray tracing may rely on traversing hierarchies in orders given by heuristics to efficiently find intersections of rays and scene geometry. In fact, bounding volume hierarchies may be used in ray tracing due to a number of desirable properties such as flexibility, re-fitting, and simplicity of construction. Exemplary efficient traversal order heuristics may first visit the child node identified by the closer intersection of its bounding volume and the ray. For shadow rays it may pay off to first visit the bounding box with the larger surface area.

One exemplary algorithm for binary hierarchy traversal is to traverse the tree top-down using a stack for backtracking: In each node the ray may be intersected with the bounding volumes of both children. If both children are intersected, the traversal order heuristic may decide which one of them is postponed and may push it onto the stack. Whenever traversal ends in a leaf node or no intersection with children has been found, a node may be popped from the stack.

While stack-based traversal on GPUs may be efficient, the stack ma) need to be maintained, and this may come with an overhead with regard to state memory and required bandwidth. See, for example, "Understanding the efficiency of ray traversal on GPUs" (Aila et al.), which is hereby incorporated by reference in its entirety. Traversal may be improved by introducing a new stackless traversal algorithm for GPUs that relies on one or more of optimizations based on statistical evidence of what nodes are visited during backtracking, a perfect hashing scheme to map keys of nodes of a binary hierarchy to their addresses in memory, and parallel construction at moderate cost in time and memory.

Furthermore, the early termination through the smart handling of disjoint traversal intervals and the simple pausing and resuming of hierarchy traversal may deliver additional benefit in both ray tracing software and hardware.

Efficient Stackless Traversal

FIG. 13 illustrates pseudocode 1300 of a traversal kernel that performs backtracking in constant time, in accordance with one embodiment. Of course, it should be noted that the pseudocode 1300 is set forth for illustrative purposes only, and thus should not be construed as limiting in any manner.

In one embodiment, the majority of references to nodes to be processed next during hierarchy traversal may be retrieved using only one register instead of a stack, while the remaining fraction of references may be retrieved in constant time using a register for a current key, a register for a bit trail, and a perfect hash map that efficiently can be constructed in parallel. In another embodiment, one or more techniques may be implemented to further reduce the number of intersections.

Storing the Most Recently Postponed Node in a Register

Figure 7:
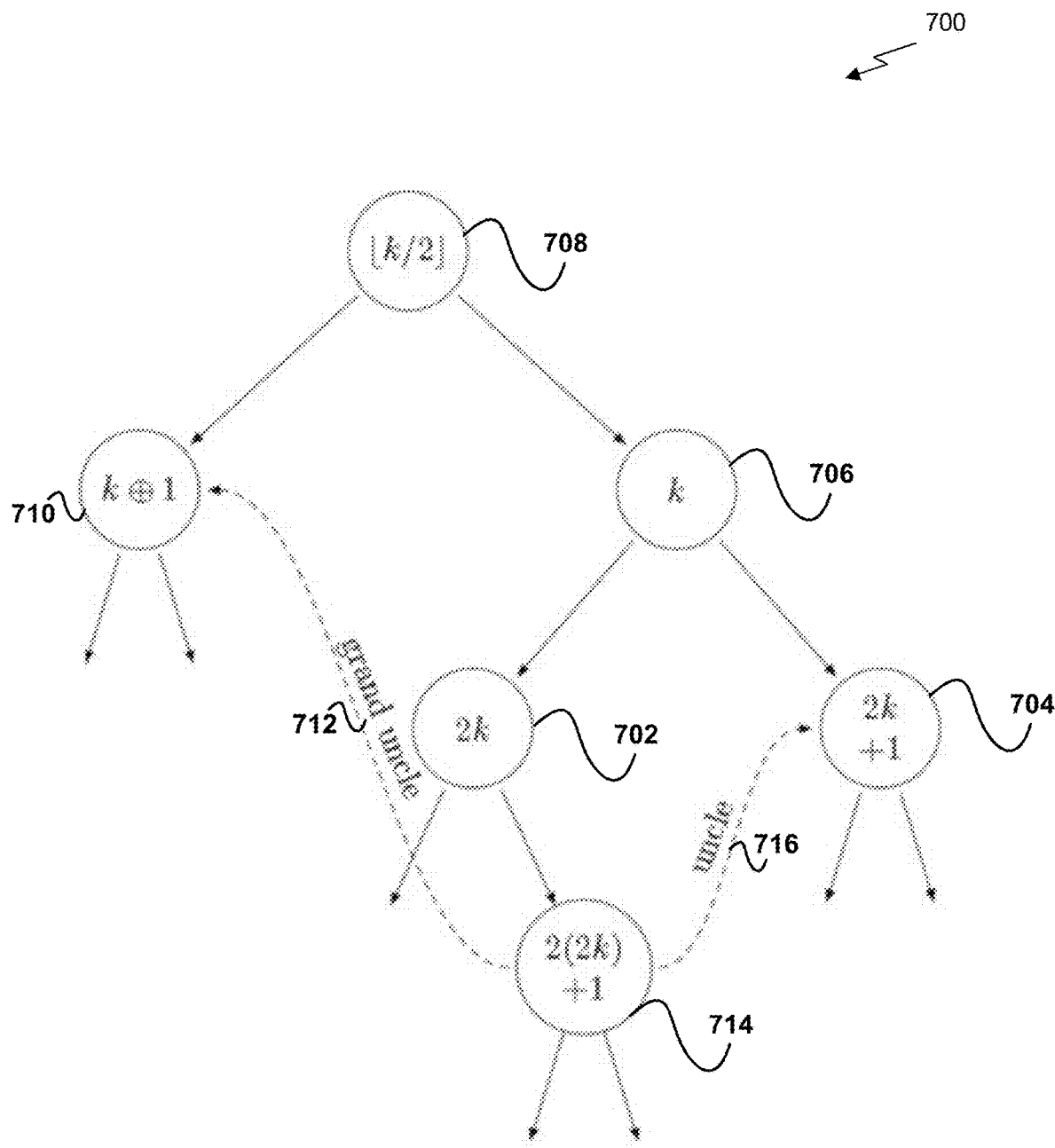
FIG. 7 illustrates an exemplary numbering convention for keys of the nodes in a tree, in accordance with one embodiment.

FIG. 7 illustrates an exemplary numbering convention 700 for keys of the nodes in a tree, in accordance with one embodiment. As shown, the children 702 and 704 of a node 706 with key k have the keys 2k and 2k+1, respectively. The parent 708 of the node 706 with key k is $\lfloor k/2 \rfloor$, while the sibling 710 has the key k⊕1, where ⊕ is the bit-wise XOR operation. The dashed arrow 712 from the node 714 having key 2(2k)+1 points to the grand uncle 710, and the dashed arrow 716 from the node 714 having key 2(2k)+1 points to the node's parent's sibling $\lfloor (2\cdot(2\cdot k)+1)/2 \rfloor \oplus 1 = 2\cdot k+1$, which is the key of the uncle 704.

Figure 8:
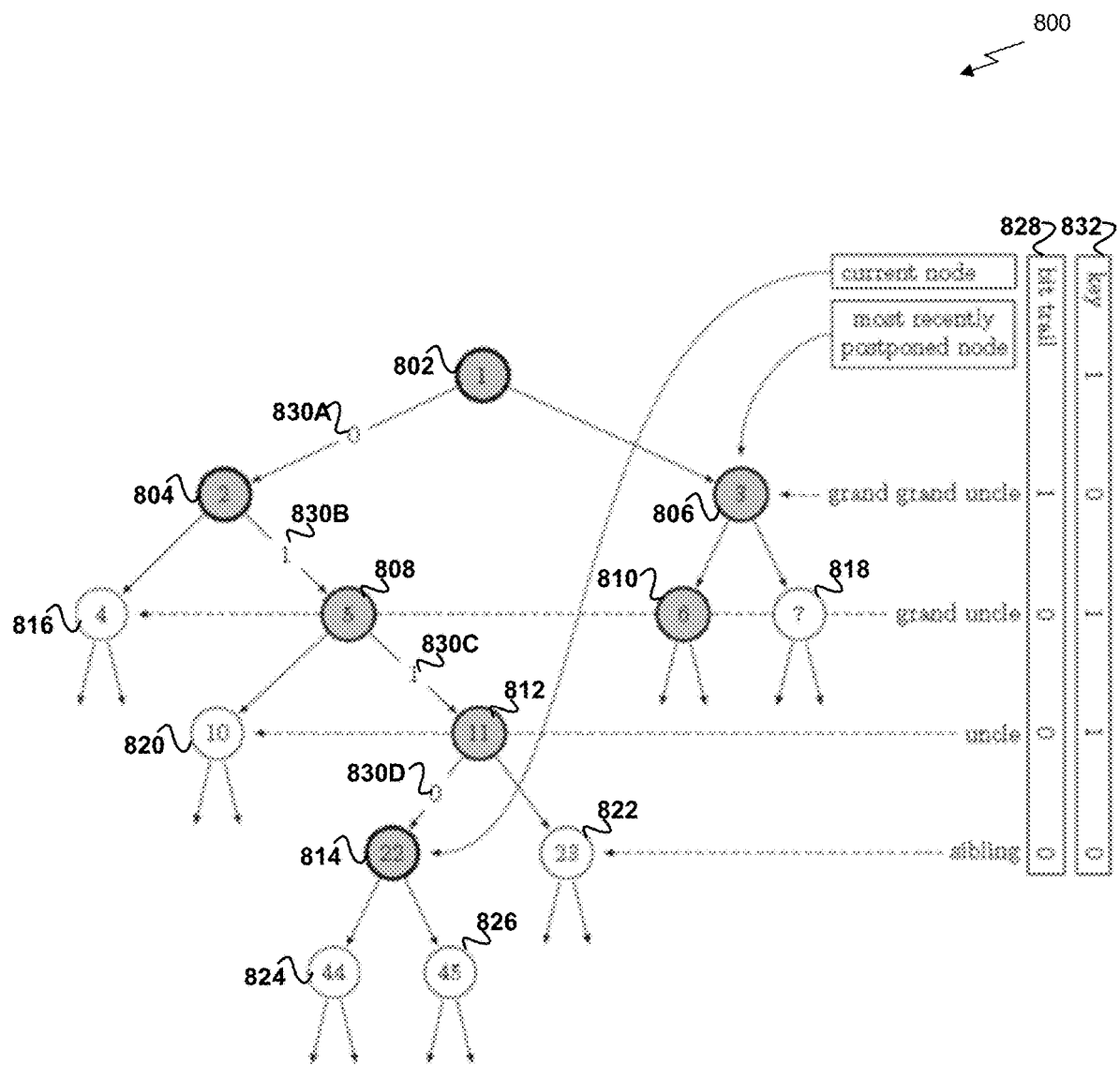
FIG. 8 illustrates an exemplary snapshot of a traversal state of a hierarchy, in accordance with one embodiment.

FIG. 8 illustrates an exemplary snapshot of a traversal state 800 of a hierarchy, in accordance with one embodiment. As shown, dark nodes 802-814 are the nodes that are touched during a traversal. On the way from the root node 802 with key 1 to the current node 814 with key 22, the node 806 with key 3 has been identified as the most recently postponed node, while the bounding boxes of the white nodes 816-826 have not been intersected by the ray. As the node 824 with key 44 and the node 826 with key 45 have not been intersected, traversal has to continue with backtracking, in this example to the most recently postponed node 806 with key 3. Note that the bit trail 828 is relative to the current node 814 and has a zero entry on each level where the siblings are not to be visited. The length of the bit trail 828 is identical to the length of the path to the current node 814, which is indicated by the bits 830A-D on the edges. A register 832 stores the key of the current node 814 in binary.

In one embodiment, the hierarchy may be traversed down until either a leaf node is reached or both bounding boxes of the children are missed by the ray. Intersecting both children may require to postpone one child, whose reference is stored in the register 832 as the most recently postponed node.

In another embodiment, a second register may be used as a bit trail 828 for bookkeeping. See, for example, "Kd-jump: A path-preserving stackless traversal for faster isosurface raytracing on GPUs" (Hughes et al.). "Restart trail for stackless BVH traversal" (Laine), and "Stackless multi-BVH traversal for CPU, MIC and GPU ray tracing" (Afra et al.), which are hereby incorporated by reference in their entirety. For example, whenever descending a level in the hierarchy, the bit trail 828 may be shifted one bit to the left and the last bit is set, if and only if the ray intersected both bounding volumes of the children. Thus the number of trailing zeros may indicate how many levels up in the hierarchy the next sibling has to be visited. For example, a set least significant bit indicates that the sibling of the current node 814 needs to be visited, $10_2$ as the least significant two bits references the uncle, while $100_2$ refers to the grand uncle. In addition, references to siblings of ancestors like uncle, grand uncle, etc. may be stored in unused padding memory.

Figure 9:
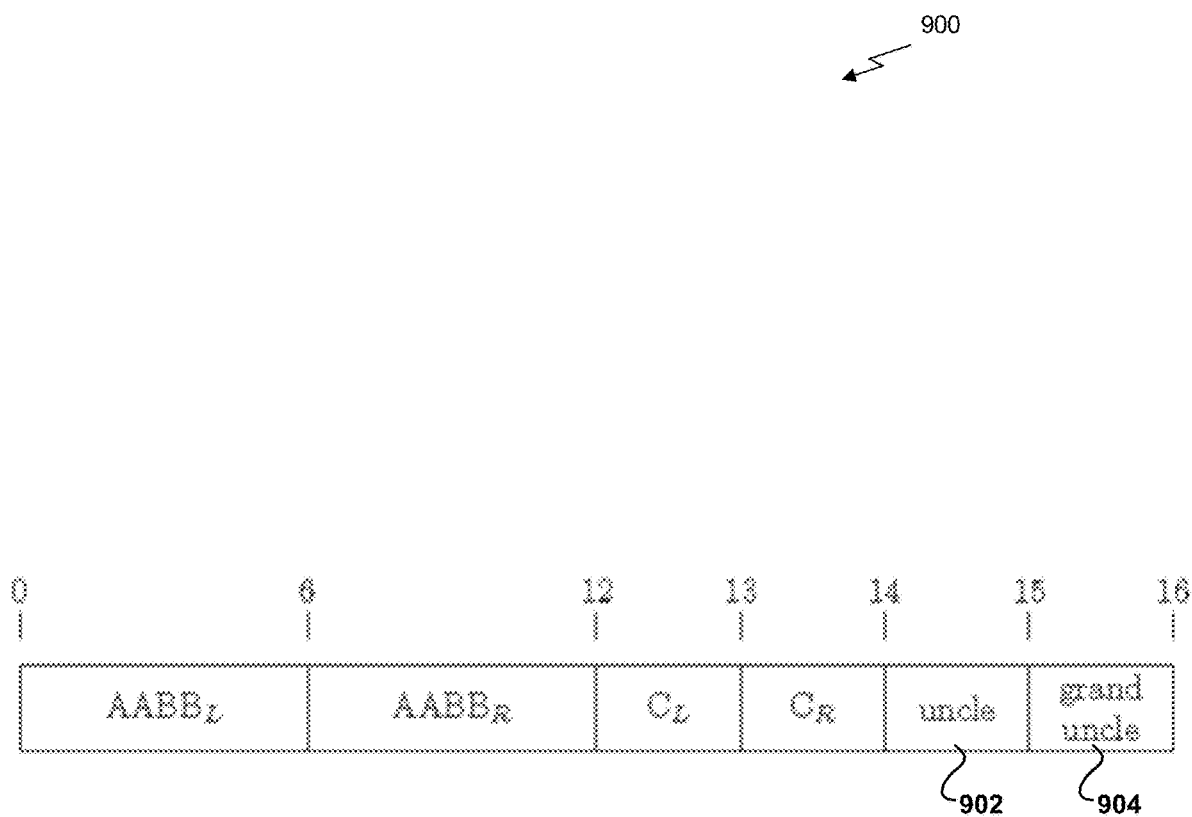
FIG. 9 illustrates an exemplary node data structure, in accordance with one embodiment.

FIG. 9 illustrates an exemplary node data structure 900, in accordance with one embodiment. A shown, the exemplary node data structure 900 is for a node in a tree that stores a reference to an uncle of the node in a first memory location 902, as well as a reference to a grand uncle of the node in a second memory location 904, where the first memory location 902 and the second memory location 904 are located as padding memory in a single memory footprint.

Figure 10:
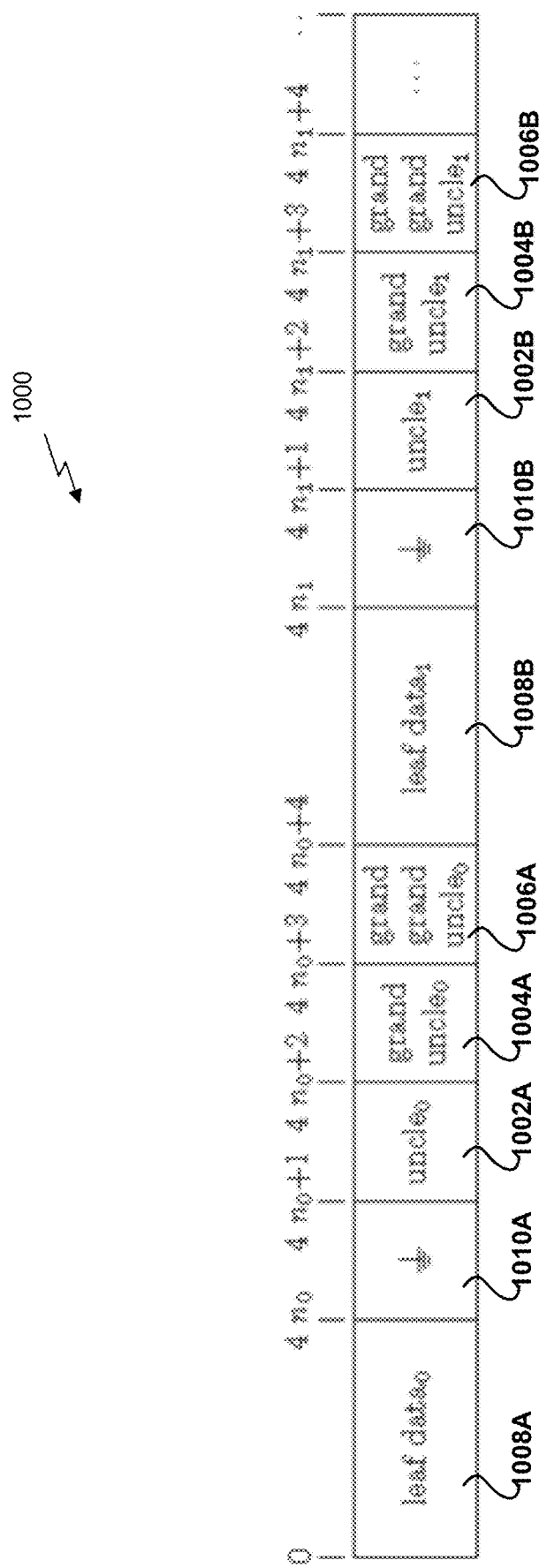
FIG. 10 illustrates an exemplary leaf data array, in accordance with one embodiment.

FIG. 10 illustrates an exemplary leaf data array 1000, in accordance with one embodiment. A shown, the exemplary leaf data array 1000 has uncle references 1002A-B, grand uncle references 1004A-B, and grand grand uncle references 1006A-B located in padding memory after leaf data 1008A-B and termination markers 1010A-B.

Loading the bounding boxes for intersection testing may then also load the references to the children, uncle, and grand uncle. So if no most recently postponed node has been stored, yet, the uncle reference may be stored if its corresponding bit in the bit trail was set, or otherwise the reference to the grand uncle may be stored if its corresponding bit in the bit trail was set.

When all threads of a warp either reached a leaf node or the descent could not be continued as none of the bounding boxes were intersected, traversal of nodes may be paused. Then, all threads which have to intersect with data in leaf nodes may perform the intersection test with the primitives it references. In one embodiment, there may be three unused 32-bit elements after a termination marker. This available space may be used to store references to the uncle, grand uncle, and grand-grand uncle of the current node. If the most recently postponed node is not set and the bit trail indicates that at least one of these three must be visited, it may be set to the one on the lowest level which also has the corresponding bit set in the bit trail. Afterwards, all threads may perform backtracking to resume traversal.

Backtracking in Constant Time

In one embodiment, siblings, uncles, and grand uncles within a tree may be the most likely backtracking targets. References to these nodes may be stored in the most recently postponed node register and consequently these targets may be accessed in constant time. Unless overwritten, even targets higher up in the tree may have been stored in the most recently postponed node register. If not set, this register may be updated whenever a node is loaded including siblings, uncles, grand uncles, and potentially grand-grand uncles and thus may extend the concept of a short stack. See, for example, "Interactive k-d tree GPU raytracing" (Horn et al.), which is hereby incorporated by reference in its entirety.

In order to enable backtracking in constant time for all remaining uncles, a numbering convention for the nodes in a binary tree may be used. For example, the root node has the key 1, while each left child is double the key of its father, and its sibling, the right child, has the key twice of its father plus one. Note that the position of the leading one of the binary representation of the key of a node in fact is the length of the path from the root to this node, while the sequence of digits following the leading one identifies the branches taken along the path down the tree.

During traversal, a key of the current node 814 may be kept in an additional register 832, as shown in FIG. 8. Updating the key may be similar to updating the bit trail 828—while descending the tree, the key may be shifted one to the left. If traversal continues with the right child, the last bit in the key may be set using binary xor/or with one. While descending the tree, the bit trail may be shifted one to the left. If traversal requires to visit both children, the last bit in the bit trail may be set to one, zero otherwise.

The selected numbering convention may allow for directly computing the key 832 of the node that would be reached by backtracking. For example, bits at identical positions in the key 832 of the current node and the bit trail 828 may relate to the same level in the tree. Therefore, going up in the hierarchy by shifting the bit trail 828 to the right by the number of trailing zeros, the key of the resulting node may be obtained by applying the identical shift operation to the key 832 of the current node 814. i.e., just shortening its key. In the same way, toggling their least significant bits may switch both the key 832 and the bit trail 828 to the other sibling. Note that the shift may be determined in constant time using native instructions that reverse bits and count the leading zeros.

Perfect Hashing

Using a perfect hash map, the updated key may be mapped to the address of the next node in constant time. As a consequence, the code divergence due to a backtracking loop may be completely removed. In fact, the hash tables may be considered a complementary acceleration data structure.

Table 2 illustrates a hash method to map a key k to an index h(k) in a hash table of size H that contains the address of the associated node, in accordance with one embodiment. Of course, it should be noted that the hash method shown in Table 2 is set forth for illustrative purposes only, and thus should not be construed as limiting in any manner.

TABLE 2

$h(k) := (k + d_{k \bmod D}) \bmod H$

Also, see, for example, "Storing a sparse table" (Tarjan et al.), "Practical minimal perfect hash functions for large databases" (Fox et al.), and "Perfect spatial hashing" (Lefebvre et al.), which are hereby incorporated by reference in their entirety. Selecting the size D of the additional displacement table d to be a power of two may allow one to replace the inner modulo operation with a cheaper bit-wise AND operation & (D−1). If furthermore $D<2^{32}$, only the 32 least significant bits of the key may need to be considered for the operation. As the table d may require only a small fraction of the overall data, the above optimization may be desirable.

In one embodiment, storing uncle, grand uncle, and the most recently postponed node may improve traversal performance. This may not increase the memory footprint, as memory is loaded anyhow, and the cost is only one more register.

In another embodiment, storing uncle and grand uncle references in the nodes instead of parents and siblings may allow for faster iterative backtracking. In this way, backtracking may advance by two levels in one step. As backtracking could also go over leaf nodes, uncles and grand uncles of leaf nodes may be determined without having to search for the data beyond the termination marker. The used data structure has still empty space in the triangle identifier array, which may be used for this purpose.

Parallel Construction of the Hash Tables

The two tables for performing perfect hashing may be constructed in time linear in the number of nodes to be hashed. Larger tables may in turn allow for a much faster construction. In addition, only keys of nodes whose references are not always stored in the most recently postponed node register may need to be hashed. For example, keys may only be hashed if their corresponding node has at least a grand nephew, which is an internal node, or at least a grand-grand nephew that is a leaf node.

The size D of the displacement table d may be set to the highest power of two smaller than half the number of BVH nodes, and the size of the perfect hash table may be selected as the smallest co-prime number greater than twice the number of BVH nodes. As a result, H may be odd.

Observing the sequential construction algorithm for a perfect hash function, the number of displacement values with the same number of dependencies may be large, which may allow for a very simple and fast parallel construction method. First, all keys k may be mapped to their associated displacement values with index k mod D and the number of dependencies may be counted in parallel. Then, the displacement values may be sorted in parallel by decreasing the number of dependencies. Finally, the displacement values may be processed in parallel in batches with the same number of dependencies to resolve all conflicts in the hash table. For example, conflicts may be resolved by first hashing all dependent keys of a displacement value, and checking if the resulting cells in the hash map are empty. If this test fails for at least one of the keys, a linear search may be performed to find an appropriate displacement value that resolves the collisions for all keys simultaneously.

In one embodiment, the node address of displacement values with only one dependent key may be stored directly in the displacement value and these cases may be marked using the integer sign. As leaf nodes are also indicated by negative integers and can also be referenced, the addresses may be shifted to allow for a distinction. This shift may halve the number of primitives that can be referenced. This optimization may not only improve construction performance, as it may leave more empty space in the hash table, but it may also remove the second dependent load operation for that case.

One indirection may also be removed by storing all data of internal nodes directly in the hash table. Then, all references to children and uncles in the node data may be updated to the new positions.

Disjoint t-Intervals Mask

During the determination of the closest intersection of a ray and the scene boundary, traversal may continue after a first hit point has been found, because even though traversal is ordered along the ray, bounding volumes of adjacent subtrees may overlap, and therefore it may not be guaranteed that all subtrees rooted by a postponed node are completely behind this point of intersection.

Figure 11:
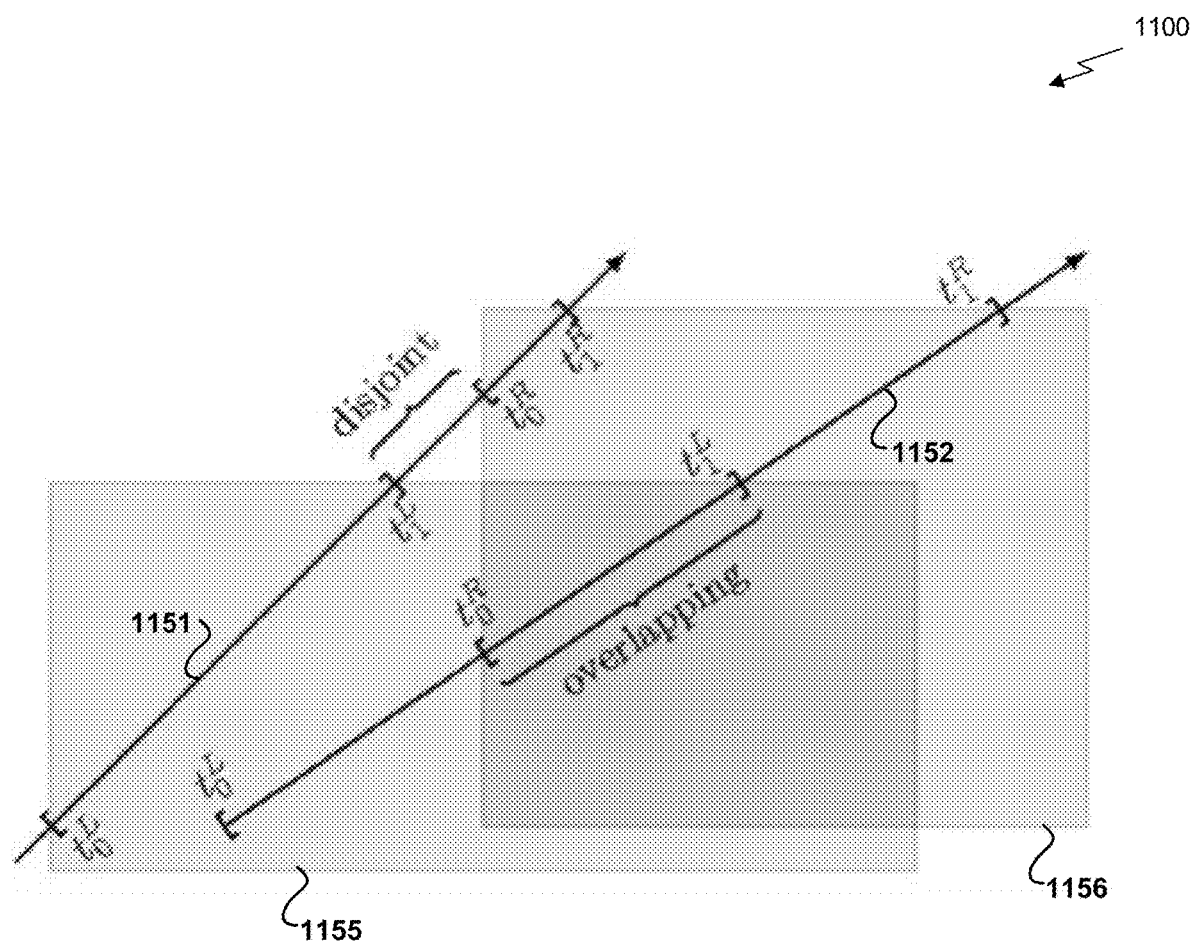
FIG. 11 illustrates an exemplary snapshot of two exemplary rays traversing a set of overlapping bounding volumes, in accordance with one embodiment.

FIG. 11 illustrates an exemplary snapshot 1100 of two exemplary rays 1151 and 1152 traversing a set of overlapping bounding volumes 1155 (left) and 1156 (right), in accordance with one embodiment. Intervals along the rays are parameterized by t, where the first interval intersecting the left bounding volume 1155 is denoted by $[t_0^L, t_1^L]$ and the second interval intersecting the right bounding volume 1156 is denoted by $[t_0^R, t_1^R]$. If both intervals along one ray intersect, the ray passes a region of overlap.

However, after an intersection has been found, postponed nodes for which to is greater than the distance to the point of intersection may be pruned. See, for example, "Acceleration Methods for Ray Tracing based Global Illumination" (Dammertz), which is hereby incorporated by reference in its entirety. In another example, as illustrated in FIG. 11, in an ordered traversal, subtrees rooted by a postponed node may be pruned if an intersection has been found inside the current subtree and the t-intervals of the intersection of the ray with the postponed node and its sibling were disjoint (upper ray 1151). In yet another example, there may be intersections of rays with two bounding volumes that result in overlapping t-intervals (lower ray 1152).

In one embodiment, a cheaper, but at the same time less strict, criterion may be implemented. While disjoint bounding volumes of siblings may guarantee that the entire subtree rooted by a postponed node is behind the one processed first, it may be sufficient to check for each ray whether the t-intervals of the intersections with the bounding boxes of the two children are disjoint. This more general criterion may be simple to check as all information may be available during traversal. This criterion may also not require any additional information in the hierarchy data, and may not only cover the case of disjoint volumes (e.g. enforced by an SBVH builder), but may also allow for pruning of overlapping volumes when the ray does not intersect the region of overlap—given a closer intersection has been found.

Using a second bit trail, one bit per level may be stored that indicates that the current i-intervals are not disjoint. After a point of intersection has been found inside the current bounding volume, this trail may be used to mask out all subtrees that cannot be reached anymore: "bitTrail &=disjointIntervalsTrail." If the most recently postponed node reference is set, and if the corresponding bit in the trail—the least significant bit—is masked out, the most recently postponed node reference may be unset. This test may be performed by checking "(bit-Trail & –bitTrail) & disjointIntervalsTrail." In this way, the number of postponed nodes that need to be visited may be reduced when using this mask. For example, accounting for disjoint t-intervals may reduce a number of postponed nodes that need to be checked again.

Pausing and Resuming

Stackless methods may allow for efficiently pausing and resuming traversal, because only a small state of constant size must be saved. For example, traversal may be paused to perform intersection in separate kernels or to reorder rays for divergence reduction. Traversal may be resumed after an intersection has been found, which often is desirable for handling transparency, translucency, or for path tracing. See, for example, "Bit-trail traversal for stackless LBVH on DirectCompute" (Murguia et al.) and "Fast parallel construction of stack-less complete LBVH trees with efficient bit-trail traversal for ray tracing" (Garcia et al.), which are hereby incorporated by reference in their entirety.

With stackless traversal, pausing and resuming may be realized by providing at least a value for nodeKey, as shown in FIG. 13. Then, nodeAddr may be determined from the hash map and the bit trail may be set to ones for all bits below the most significant one in the key. Unless the ray direction or origin have been changed, storing the bit trail in addition may avoid revisiting uncles that already have been culled. The address mrpnAddr of the most recently postponed node may not need to be stored, because one backtracking step may need to be performed before leaving the traversal loop as the current node address may have already been processed. Then, mrpnAddr may either not be set or nodeAddr may be set to mrpnAddr.

Instances may be handled similarly. For example, the original ray state may be stored, while a new one may be initialized for traversing the instance. On return, the previously stored state may be used to resume traversal. Note that while it may be simple to extend the number of bits in a bit trail to accommodate deep trees, instances also may be used to extend traversal depth at the cost of just a few registers.

Unless the ray direction changes, transparent surfaces may be handled as discussed above. However, changing the origin or direction of the ray upon resuming in a point of intersection, as for example in path tracing, the bit trail may become invalid and all uncles up to the root node may need to be checked for intersection. A realization as latency hiding hardware may also be implemented.

In this way, global memory may not need to be accessed whenever nodes are postponed, but may only require operations on registers. Additionally, the determination of the address of the next postponed node may require one or two potentially scattered memory fetches. However, memory access to the hash map may be read only, whereas a stack-based approach may also need to store in global memory. Further, the extra memory for the hash tables may be linear in the number of nodes, whereas the extra stack memory for a stack-based approach may be linear in the number of rays times stack size.

Pausing and resuming and the disjoint t-intervals mask may reduce the number of nodes that need to be loaded as well as the number of postponed nodes at a low overhead. Different BVH construction methods with more aggressive split criteria may further improve performance. When continuing light transport paths from the node of intersection instead of starting traversal from the root node of a tree, close occlusions may be found faster during traversal.

This stackless traversal method may result in efficient backtracking in constant time. Besides the use of uncle references and storing the most recently postponed node in a register, perfect hashing may completely eliminate one source of divergence on wide SIMD architectures. See, for example, "Megakernels considered harmful: Wavefront path tracing on GPUs" (Laine et al.). "Sorted deferred shading for production path tracing" (Eisenacher at al.), and "Introduction to PowerVR ray tracing" (McCombe), which are hereby incorporated by reference in their entirety. It is straightforward to apply the techniques to other hierarchy traversals such as many-light-hierarchies and occlusion culling. Finally, the read-only memory access during traversal and the algorithm may be implemented in hardware.

N-Ary Trees

The methods previously described may be applied to N-ary trees. The children of a node with number k in an N-ary tree are numbered by Nk+i, where i is the index of the i-th child, ranging from zero to N−1. Representing the index i requires the smallest integer larger or equal to log N bits. The bit trail variable for an N-ary tree requires N−1 bits per level to indicate the N−1 other siblings. The order of the postponed nodes is at least one of fixed, computable, determined by the ray direction, determined by the octant of the ray direction, or stored in an additional register. In an N-ary tree, there are N−1 uncles.

Figure 12:
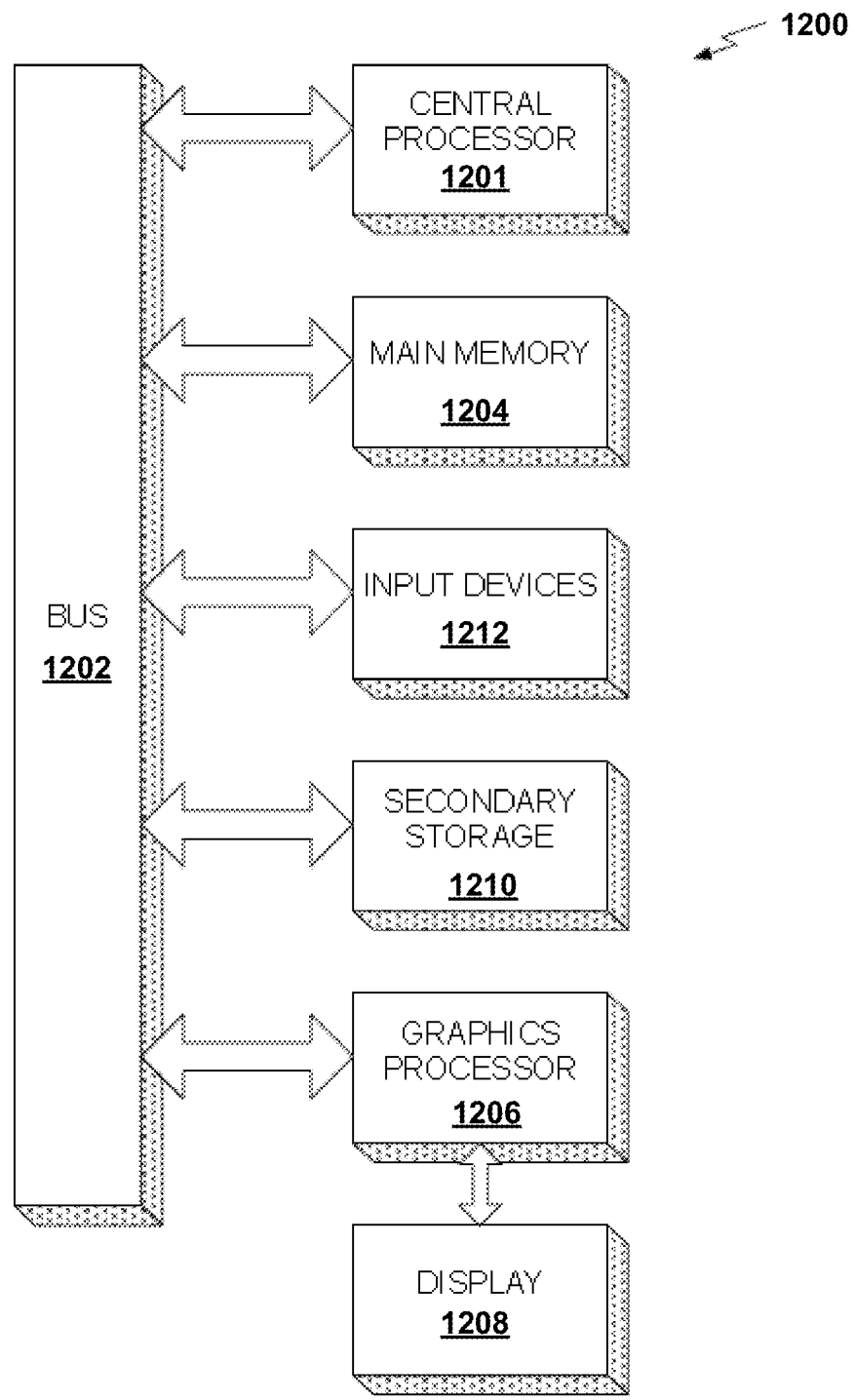
FIG. 12 illustrates an exemplary system in which the various architecture and/or functionality of the various previous embodiments may be implemented.

FIG. 12 illustrates an exemplary system 1200 in which the various architecture and/or functionality of the various previous embodiments may be implemented. As shown, a system 1200 is provided including at least one central processor 1201 that is connected to a communication bus 1202. The communication bus 1202 may be implemented using any suitable protocol, such as PCI (Peripheral Component Interconnect), PCI-Express, AGP (Accelerated Graphics Port), HyperTransport, or any other bus or point-to-point communication protocol(s). The system 1200 also includes a main memory 1204. Control logic (software) and data are stored in the main memory 1204 which may take the form of random access memory (RAM).

The system 1200 also includes input devices 1212, a graphics processor 1206, and at least one display 1208, i.e, a conventional CRT (cathode ray tube). LCD (liquid crystal display). LED (light emitting diode), plasma display or the like. User input may be received from the input devices 1212, e.g., keyboard, mouse, touchpad, microphone, and the like. In one embodiment, the graphics processor 1206 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1200 may also include a secondary storage 1210. The secondary storage 1210 includes, for example, a hard disk drive and/or a removable storage drive, representing a floppy disk drive, a magnetic tape drive, a compact disk drive, digital versatile disk (DVD) drive, recording device, universal serial bus (USB) flash memory, solid state drive (SSD), etc. The removable storage drive reads from and/or writes to a removable storage unit in a well-known manner.

Computer programs, or computer control logic algorithms, may be stored in the main memory 1204 and/or the secondary storage 1210. Such computer programs, when executed, enable the system 1200 to perform various functions. The memory 1204, the storage 1210, and/or any other storage are possible examples of computer-readable media.

In one embodiment, the architecture and/or functionality of the various previous figures may be implemented in the context of the central processor 1201, the graphics processor 1206, an integrated circuit (not shown) that is capable of at least a portion of the capabilities of both the central processor 1201 and the graphics processor 1206, a chipset (i.e., a group of integrated circuits designed to work and sold as a unit for performing related functions, etc.), and/or any other integrated circuit for that matter. Further still, the circuit may be realized in reconfigurable logic. In one embodiment, the circuit may be realized using an FPGA (field gate programmable array).

Still yet, the architecture and/or functionality of the various previous figures may be implemented in the context of a general computer system, a circuit board system, a game console system dedicated for entertainment purposes, an application-specific system, and/or any other desired system. For example, the system 1200 may take the form of a desktop computer, laptop computer, server, workstation, game consoles, embedded system, and/or any other type of logic. Still yet, the system 1200 may take the form of various other devices including, but not limited to a personal digital assistant (PDA) device, a mobile phone device, a television, etc.

Further, while not shown, the system 1200 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    traversing a tree by a processor;
    during the traversing, maintaining a bit trail variable and a current key variable in registers associated with the processor, the bit trail variable including a first plurality of bits indicating tree levels on which a node has been postponed along a path from a root of the tree during the traversing, and the current key variable including a second plurality of bits indicating a number of a current node within the tree; and
    performing backtracking to a postponed node within the tree during the traversing, utilizing the bit trail variable and the current key variable, wherein an address of the postponed node is obtained in constant time using a perfect hash map,
    wherein the current key variable is maintained by appending a 0 bit to the first plurality of bits when a left child of a node is selected when the traversing proceeds past the node or appending a 1 bit to the first plurality of bits when a right child of the node is selected when the traversing proceeds past the node, and
    wherein the bit trail variable is maintained by appending a 0 bit when no backtracking is required when the traversing proceeds past the node or appending a 1 bit when backtracking is required when the traversing proceeds past the node.

2. The method of claim 1, wherein the tree is a binary tree.

3. The method of claim 2, further comprising maintaining another variable m that identifies levels on a path from a root of the tree to the current node within the tree on which either bounding boxes of two children do not overlap or a ray does not intersect an overlapping area.

4. The method of claim 3, wherein each bit of m is assigned to one node on the path, starting from the root of the tree and a least significant bit of the variable m.

5. The method of claim 4, wherein, in response to identifying only a closest intersection, the traversing omits levels for which the variable m indicates disjoint bounding boxes or for which the variable m indicates that the ray does not intersect the overlapping area.

6. The method of claim 5, wherein, upon identifying an intersection, the bit trail variable t is updated to t AND m, where AND denotes a bitwise "and" operation.

7. The method of claim 6, further comprising accessing the most recently postponed node, using the most recently postponed variable, updating the current key variable and bit trail variable, and checking if the most recently postponed node can be omitted by checking (t AND −t) AND m.

8. The method of claim 2, wherein performing the backtracking includes identifying a number of a postponed node by:
    determining a first number of bits, the first number of bits including a number of trailing 0 bits in the first plurality of bits, starting with a least significant bit of the first plurality of bits,
    removing the first number of bits from the first plurality of bits of the bit trail variable to create a third plurality of bits, starting with the least significant bit of the first plurality of bits,
    removing the first number of bits from the second plurality of bits of the current key variable to create a fourth plurality of bits, starting with the least significant bit of the second plurality of bits, and
    flipping the least significant bit of the fourth plurality of bits to obtain the number of the postponed node in binary.

9. The method of claim 1, wherein the perfect hash map includes:
    a table h, having size H, that stores node addresses, and an additional displacement table d, having size D;
    wherein given a position p of a node, a memory address a is calculated as $a(p):=(p+d[p \bmod D]) \bmod H$.

10. The method of claim 9, wherein the perfect hash map is constructed in parallel.

11. The method of claim 9, wherein the size D of the additional displacement table d is a power of two.

12. The method of claim 1, further comprising, during the traversing, maintaining a most recently postponed variable that includes a third plurality of bits indicating a number of a most recently postponed node within the tree.

13. The method of claim 12, wherein performing the backtracking includes accessing the most recently postponed node, using the most recently postponed variable, and updating the current key variable and bit trail variable.

14. The method of claim 1, further comprising:
    identifying an intersection at the current node within the tree; and
    restarting the traversing at the current node.

15. The method of claim 14, wherein each bit of the first plurality of bits of the bit trail variable that refers to a leaf above the current node is set to 1, and all other bits of the first plurality of bits are set to 0.

16. The method of claim 14, further comprising reusing the first plurality of bits of the bit trail variable upon determining that a current ray origin and direction match a previous ray origin and direction of a previous path segment.

17. The method of claim 16, wherein the reusing is performed for one or more of transparency, translucency, and alpha cutouts.

18. The method of claim 1, wherein the tree is an N-ary tree.

19. A system comprising:
    a processor that is configured to:
        traverse a tree;
        during the traverse, maintain a bit trail variable and a current key variable in registers associated with the processor, the bit trail variable including a first plurality of bits indicating tree levels on which a node has been postponed along a path from a root of the tree during the traversing, and the current key variable including a second plurality of bits indicating a number of a current node within the tree; and
        perform backtracking to a postponed node within the tree during the traversing, utilizing the bit trail variable and the current key variable, wherein an address of the postponed node is obtained in constant time using a perfect hash map,
    wherein the current key variable is maintained by appending a 0 bit to the first plurality of bits when a left child of a node is selected when the traversing proceeds past the node or appending a 1 bit to the first plurality of bits when a right child of the node is selected when the traversing proceeds past the node, and
    wherein the bit trail variable is maintained by appending a 0 bit when no backtracking is required when the traversing proceeds past the node or appending a 1 bit when backtracking is required when the traversing proceeds past the node.

20. A non-transitory computer-readable storage medium storing instructions that, when executed by a processor, causes the processor to perform steps comprising:
- traversing a tree;
- during the traversing, maintaining a bit trail variable and a current key variable in registers associated with the processor, the bit trail variable including a first plurality of bits indicating tree levels on which a node has been postponed along a path from a root of the tree during the traversing, and the current key variable including a second plurality of bits indicating a number of a current node within the tree; and
- performing backtracking to a postponed node within the tree during the traversing, utilizing the bit trail variable and the current key variable, wherein an address of the postponed node is obtained in constant time using a perfect hash map,
- wherein the current key variable is maintained by appending a 0 bit to the first plurality of bits when a left child of a node is selected when the traversing proceeds past the node or appending a 1 bit to the first plurality of bits when a right child of the node is selected when the traversing proceeds past the node, and
- wherein the bit trail variable is maintained by appending a 0 bit when no backtracking is required when the traversing proceeds past the node or appending a 1 bit when backtracking is required when the traversing proceeds past the node.

* * * * *